Sept. 3, 1968  C. J. NEWMAN ET AL  3,400,262
VEHICLE LAMP MOUNTING AND WIRING FIXTURE
Filed Dec. 14, 1966
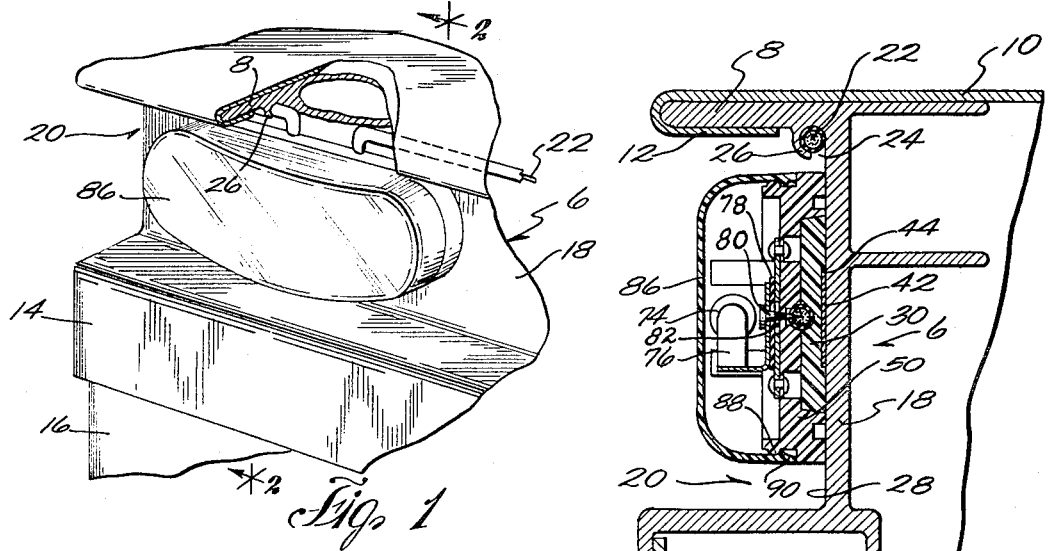
Fig. 1
Fig. 2
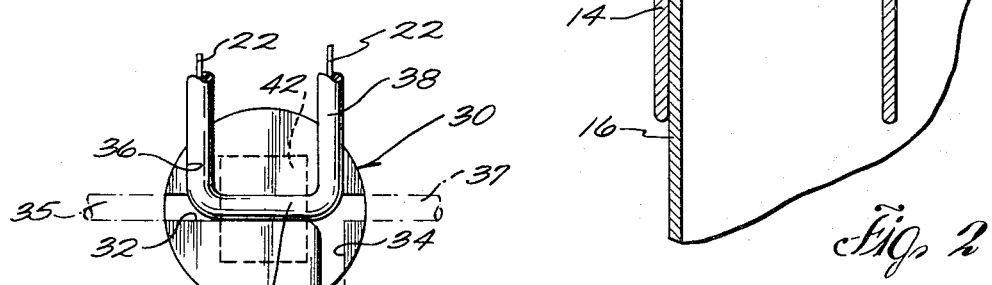
Fig. 3
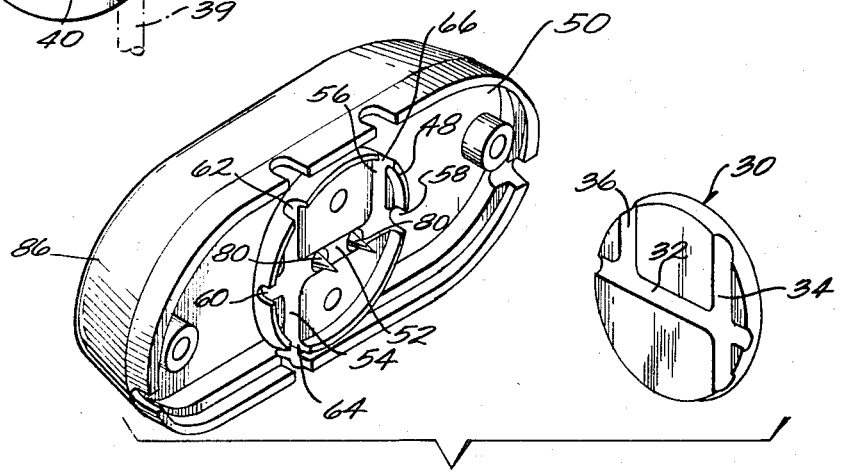
Fig. 4
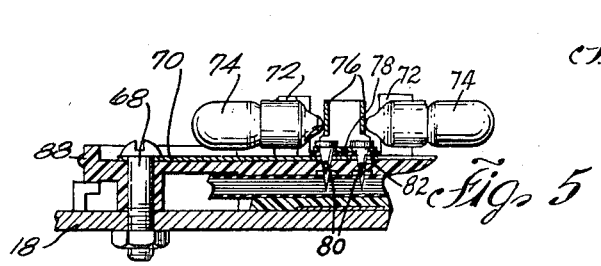
Fig. 5
Inventors
Charles J. Newman
Elbert J. Lucas
By Wheeler, Wheeler, House & Clemency
Attorneys.

United States Patent Office 3,400,262
Patented Sept. 3, 1968

3,400,262
VEHICLE LAMP MOUNTING AND
WIRING FIXTURE
Charles J. Newman, Madison, Ind., and Elbert J. Lucas,
Andalusia, Ala., assignors to The Grote Manufacturing Company, Inc., Madison, Ind., a corporation of
Kentucky
Filed Dec. 14, 1966, Ser. No. 601,630
7 Claims. (Cl. 240—8.2)

ABSTRACT OF THE DISCLOSURE

A lamp base-positioning plate having a back face with adhesive for mounting the plate on a vehicle. The front face of the plate is provided with a channel. A lamp base having a bulb socket mounted thereon is telescopically engaged with the positioning plate. The bulb socket is provided with prongs for penetrating the insulation of an electrical conductor located in the channel. A bolt is used to mount the lamp base on the vehicle and also functions as an independent ground connection. A translucent shell is mounted on the lamp base and covers the lamp socket.

---

A lamp base adapted for use in any of the five major methods of installation on a motor vehicle is especially designed for purposes of the present invention for interlocking engagement with an insert plate which is used as a template and receives the rough wiring and holds the wiring in a position such that contacts on the lamp base automatically effect electrical connection with the wiring when the lamp base is assembled to the insert.

The insert is provided with pressure-sensitive adhesive on its back for rapid and easy assembly to the vehicle body frame or skin. It is channeled to receive and position an insulated power supply wire led thereto from any source. Only the insert is required on the job site when the rough wiring is being installed. At any subsequent time, a lamp body is engaged telescopically with the insert and connected to the vehicle wall not only to locate the lamp properly on the vehicle but to provide for immediate completion of the circuit through the grounded lamp bulb by penetration through the power wire insulation of prongs which are a permanent part of the lamp body.

Background of the invention

Automotive bodies and particularly trailer bodies are made in many different styles and wired in many different ways. For illustrative disclosure of the present invention, we have illustrated fragmentarily a typical trailer wall structure which has an exterior channel formed in a frame extrusion designed to have the trailer top and side wall skin surfaces connected therewith, the extrusion channel integrally providing an elongated passage in which the supply or "hot" wire is disposed. In the instant exemplification, the lamps are mounted in this channel and supplied with current from the wire disposed in the passage. In the past, it has been necessary for the person doing the wiring to locate each lamp individually on the trailer body and individually to connect the service wire with the terminal of the lamp by baring an appropriate portion of the service wires either to receive a pigtail connection for the lamp or to be looped about the lamp terminal and bolted thereto.

In the instant device, inserts are adhesively attached to the back of the channel (or any other appropriate part of the vehicle body) at the respective points at which lamps are desired. When the insulated service wire is placed in the passage, it is provided with a loop positioned in an appropriate channel of the insert. After the entire wiring job is done in this manner, without any lamp even being present, the respective lamps are assembled with the respective inserts and secured by bolts or the like. As they are telescopically engaged with the inserts, channels in the lamp base complementary to those of the inserts, incapsulate the insulated wire while, at the same time, a prong or prongs mounted on the lamp base, and electrically connected with the lamp socket, penetrate the insulation of the wire and make operative electrical connection with the conductor. The bolts which secure the lamp body provide a ground. The assembly is waterproof and troubleproof and can be replaced almost instantly in the event of damage.

Description of the invention

FIG. 1 is a view in perspective fragmentarily illustrating a rear upper corner portion of a trailer for which an extrusion provides a structural member and has a channel for lamp mounting, portions of the extrusion being broken away.

FIG. 2 is an enlarged detail view in cross section on the line 2—2 of FIG. 1.

FIG. 3 is a view of the insert in front elevation, an insulated service wire being fragmentarily illustrated.

FIG. 4 is a view of a lamp housing designed for cooperation with the insert, the lamp housing and a complementary insert being shown in perspective in mutually separated positions.

FIG. 5 is a fragmentary detail view of the assembly in longitudinal section.

The extrusion 6 which is used as a portion of the vehicle frame is no part of the present invention. It merely represents one of many structures upon which our improved lamp mounting may be used. It has a top flange 8 over which the top wall 10 of the vehicle is folded at 12. The frame extrusion provides at 14 a flange to which the side wall panel 16 may be connected. The intervening frame web 18 is set inwardly to provide a deep channel 20 usable to receive the lamp assemblies. The insulated supply or power wire 22 is forced into a passage 24 in the upper inner corner of channel 20, the passage being formed by a thin and relatively flexible flange at 26.

At any desired point or points along the surface 28 of the web 18 which forms the back of channel 20, we attach a plate or disk 30 molded of dielectric material and having its face provided with one or more channels adapted to receive the supply wire. For example, there is a generally longitudinal channel for the current supply wire 22. This channel may be at any desired level. If convolutions of wire 22 are required, the channel 32 may be crossed at one end by a transverse channel 34, or may communicate with shorter channel 36 which leads from one side. FIGS. 1 and 3 show one example of the manner in which a loop 38 may be formed in the supply wire 22 at the time of its insertion in the passage 24 and forced into the channels 36, 32 and 34. The particular plate 30 is circular but this is not necessarily the case.

On the back surface of the disk 30 is a patch 42 of pressure-sensitive adhesive as shown in dotted lines in FIG. 3 and in section in FIGS. 2 and 5. The disk 30 preferably has a shallow recess at 44 to receive the patch which carries the pressure-sensitive adhesive. When the usual protective ply is stripped off to expose the adhesive 42, the disk 30 may be mounted securely to the vehicle to retain its position and that of the supply wire pending attachment of the lamp.

It will be understood that there will be a separate mounting disk 30 for each lamp to be positioned on the vehicle. It will further be understood that it is not essential to the invention that the supply wire be led to the respective disks through a passage such as that shown at 24. As above stated, the channels in the disk may be so positioned as to be adapted to hold wires led thereto from almost any direction. Some possibilities are shown in broken lines at 35, 37 and 39 in FIG. 3.

The lamp base 50 which is complementary to the disk 30 has a flange 48 which is engageable telescopically over the perimeter of the disk 30. Within this flange, the lamp base has a channel 52 complementary to the channel 32 and adapted to register therewith when the parts are assembled. It has another channel at 54 complementary to the channel 34 and a channel 56 complementary to the channel 36 of the insert. Notches 58 and 60 are provided in the flange 48 in registry with the ends of channel 52. Notches 62 and 64 are provided in the flange 48 in registry with the channel 54 and a notch 66 is provided in the flange 46 in registry with the ends of channel 56. These notches are adapted to receive a supply wire 22 regardless of whether it is to pass through the lamp base straight or is formed into a loop or into an S-curve or otherwise.

When the insulated supply wire lead 22 is in place in a channel of the disk 30, the lamp base is positioned across it. It provides a closure over the channels. The flange 48 telescopes over the perimeter of the insert and the lead.

The lamp base may be used as a template for the boring of holes in the mounting web 18 (if such holes have not already been provided). Through these holes are inserted bolts such as that shown at 68 in FIG. 5. These bolts not only hold the lamp base in place but provide it with a ground to web 18 from a conducting strap 70 which carries fingers 72 which may serve as sockets for the mounting of the respective bulbs 74.

Disposed intermediate the respective bulbs is a contact member 76 which rests on a sheet of insulation at 78 and has a live contact prong or prongs 80 extending through suitable apertures 82 in the grounded strap 70 to project from the bottom of channel 52 in the lamp base 50 in the manner clearly shown in FIG. 5. When the lamp base is bolted down, these prongs 80 are forced through the insulation of the supply lead to make electrical contact with the current carrying wire 22 therein, whereby to provide current for the bulbs 74, return being through the fingers 72 and strap 70 and bolt 68 and the panel 18 of the extrusion 6 (which is part of the frame of the vehicle).

Regardless of the direction from which the supply wire is led to the device, it can be inserted into the several channels of the lamp base insert to provide a lead or bight which is so positioned as to be engaged by the contact prongs 80 with which the lamp base is equipped.

On the basis of the foregoing explanation, it will further be evident that in the use of this device all of the actual wiring can be completed without stripping the supply wire of its insulation and without any necessity that the several lamp bases shall even be present during the wiring operation.

In practice, a shell or lens 86, usually made of colored plastic, is placed over the lamps. The lamp base and shell have complementary ribs and grooves 88, 90 (FIG. 2) for detachably maintaining the shell in place. Other details of the lamp base are not shown, as they constitute no part of the invention.

We claim:

1. The combination of a lamp base-positioning plate having a back face provided with adhesive for the mounting of the plate and having a front face provided with a channel, a lamp base constituting a closure for said channel, said base and plate having complementary telescopically engageable means for the positioning of the base from the plate, a bulb socket on the base having terminal connections one of which constitutes a ground, the other said connection comprising a prong extending from the lamp base toward the channel for which said lamp base provides a closure, the said channel constituting means for receiving an insulated wire, and the prong having an extent and position such as to penetrate the insulation of such a wire, and means electrically connected with the ground connection of said socket for the purpose of mounting said lamp base independently of said adhesive.

2. A combination according to claim 1 in which the lamp base has a channel complementary to that of the plate and into which said prong projects.

3. A combination according to claim 1 in which said base has a plurality of sockets for oppositely projecting lamp bulbs having a common ground connection and having a common live contact to which said prong is electrically connected.

4. A combination according to claim 1 in which said channel extends completely across the plate and said plate has at least one other transverse channel intersecting the channel first mentioned.

5. A combination according to claim 4 in which the lamp base has a plurality of prongs side by side projecting toward an intermediate part of the channel first mentioned, the lamp base having a plurality of channels registering with the aforesaid several channels of the plate as above defined.

6. A combination according to claim 1 in which said plate comprises a dielectric disk.

7. A combination according to claim 1 in which the lamp base is elongated and is provided with a rear face formed intermediate its ends with a flange complementary to the perimeter of said plate and constituting said telescopically engageable means for positioning the base from the plate, said base having a rib on its forward face, and a translucent shell interlockingly engaged therewith and enclosing the bulb socket.

References Cited

UNITED STATES PATENTS

| 3,087,051 | 4/1963 | Black | 240—7.1 |
| 3,130,921 | 4/1964 | Morgan | 240—8.2 |
| 3,227,868 | 1/1966 | Morgan | 240—8.2 |
| 3,256,428 | 6/1966 | Schwartz | 240—6.4 X |
| 3,321,731 | 5/1967 | Goldbaum | 240—8.2 X |

NORTON ANSHER, *Primary Examiner.*

C. E. SMITH, *Assistant Examiner.*